US006782370B1

(12) United States Patent
Stack (10) Patent No.: US 6,782,370 B1
(45) Date of Patent: Aug. 24, 2004

(54) SYSTEM AND METHOD FOR PROVIDING RECOMMENDATION OF GOODS OR SERVICES BASED ON RECORDED PURCHASING HISTORY

(75) Inventor: Charles Stack, Cleveland, OH (US)

(73) Assignee: Cendant Publishing, Inc., Aurora, CO (US)

(*) Notice: Subject to any disclaimer, the term of this patent is extended or adjusted under 35 U.S.C. 154(b) by 1030 days.

(21) Appl. No.: 08/923,293

(22) Filed: Sep. 4, 1997

(51) Int. Cl.[7] .............................................. G06F 17/60
(52) U.S. Cl. .............................. 705/10; 705/26; 705/14
(58) Field of Search ............................ 705/10, 26, 27, 705/28, 29, 14; 235/376; 707/10, 104.1

(56) References Cited

U.S. PATENT DOCUMENTS

| | | | | | |
|---|---|---|---|---|---|
| 4,870,579 | A | * | 9/1989 | Hey ............................. | 705/27 |
| 4,996,642 | A | * | 2/1991 | Hey ............................. | 705/27 |
| 5,583,763 | A | * | 12/1996 | Atcheson et al. .............. | 707/3 |
| 5,749,081 | A | * | 5/1998 | Whiteis ....................... | 707/102 |
| 5,754,938 | A | * | 5/1998 | Herz et al. ................... | 725/116 |
| 5,774,868 | A | * | 6/1998 | Cragun et al. ................ | 705/10 |
| 5,790,426 | A | * | 8/1998 | Robinson ..................... | 702/179 |
| 5,790,935 | A | * | 8/1998 | Payton ........................ | 455/5.1 |
| 5,832,457 | A | * | 11/1998 | O'Brien et al. ............... | 705/14 |
| 5,867,799 | A | * | 2/1999 | Lang et al. .................... | 707/1 |
| 6,041,311 | A | * | 3/2000 | Chislenko et al. ............ | 705/27 |
| 6,049,777 | A | * | 4/2000 | Sheena et al. ................ | 705/10 |
| 6,058,367 | A | * | 5/2000 | Sutcliffe et al. ............... | 705/1 |
| 6,092,049 | A | * | 7/2000 | Chislenko et al. ............ | 705/10 |
| 6,112,186 | A | * | 8/2000 | Bergh et al. .................. | 705/10 |
| 6,266,649 | B1 | * | 7/2001 | Linden et al. ................ | 705/26 |
| 6,507,872 | B1 | * | 1/2003 | Geshwind ................... | 709/236 |
| 2001/0013009 | A1 | * | 8/2001 | Greening et al. ............. | 705/10 |

FOREIGN PATENT DOCUMENTS

WO    WO-97/02537 A1 * 1/1997

OTHER PUBLICATIONS

"How ICL Is Ensuring That Your Retailer Knows More About You Than You Know Yourself," Computergram International, Jun. 14, 1996.*
Wilder, Clinton, "E–Commerce Emerges," Information Week, Jun. 14, 1996.*
IBM press release, M2 Presswire, "Wide variety of retailers sign up for World Avenue, IBM's online shopping service.", Nov. 12, 1996.*
Tadjer, Rivka, "Giving Content a Push," Communications Week, Jun. 2, 1997.*
Broadvision press release, M2 Presswire, "Virgin Net teams with Broadvision to deliver personalised services on Virgin Online", May 15, 1996.*
Lach, Jennifer, "Reading your mind, reaching your wallet,", Nov. 1998.*
Hof et al., "Amazon.com: The Wide World of E–Commerce," Business Week, Dec. 14, 1998.*
PRNewswire, "Book Stacks Unlimited Announces Poetry Month Exhibit", Apr. 18, 1997.*
Business Wire, CUC International Inc. offers consumers customized book recommendations through its book stacks subsidiary, Apr. 22, 1997.*
Alexandria Digital Literature, www.alexlit.com, no date known.*
Amazon.com, www.amazon.com, no date known.*
"Amazon.com Catapults Electronic Commerce to Next Level With Powerful New Features", Sep. 23, 1997.*

* cited by examiner

Primary Examiner—Nicholas D. Rosen
(74) Attorney, Agent, or Firm—Rothwell, Figg, Ernst & Manbeck (57) ABSTRACT

A computer-implemented method and system utilizing a distributed network for the recommendation of goods and/or services to potential costumers based on a potential customer's selection of goods and/or services and a database of previous customer purchasing history.

16 Claims, 7 Drawing Sheets

CLEAR AND PRESENT DANGER

Search Type: TITLE          Number of Books: 6

| | Title | Author | Date | Bind | Price |
|---|---|---|---|---|---|
| | Clear and Present Danger | Clancy, Tom | 08/94 | PAP | $5.94 |
| | Clear and Present Danger (Thorndike Large Print Series) | Clancy, Tom | 10/90 | TRD | $20.36 |
| ☐ | Clear and Present Danger | Clancy, Tom | 08/89 | TRD | $21.21 |
| ☐ | Clear and Present Danger | Clancy, Tom/ Stiers, David Ogden (Unk) | 07/94 | TRD | $17.00 |
| ☐ | Clear and Present Danger | Clancy, Tom | 07/96 | PAP | $6.38 |
| ☐ | Clear and Present Danger/Multi-Track Audio Cassettes | Clancy, Tom | 04/90 | TRD | $38.95 |

100

CLEAR AND PRESENT DANGER

By

Clancy, Tom

How Many Copies ?

ISBN: 0425144372
BOOKMARKS: 5
*YOU SAVE: $1.05 (15%)*

YOUR PRICE: $5.94
MEMBER PRICE: $4.89

*AFFINITY*<sup>SM</sup> BY SAME PEN

PUBLISHER: BRKP
CATEGORY: Movies
PUB DATE: 08/94
BINDING: Paperback
PRICE: US $6.99

100

FIG. 3D af·fin·i·ty n. 1 similarity 2 close relationship; connection 3 liking or inclination toward something With _Affinity_, our own agent-based technology, you can explore the tastes of our other customers who've bought this same book. It's completely anonymous, and requires no effort. Finally, a helpful recommendation service based on _real people's real interests!_ Based on 5 years of our customer's buying history, we think you might enjoy the book(s) listed below, purchased by customers who enjoyed _Clear and Present Danger._

| | Title | Author | Confidence In This Match |
|---|---|---|---|
| ▭ | _Eaters of the Dead_ | –Crichton, Michael | 100% |
| ▭ | _Disclosure_ | –Crichton, Michael | 100% |
| ▭ | _Red Storm Rising_ | –Clancy, Tom | 100% |
| ▭ | _Patriot Games_ | –Clancy, Tom | 100% |
| ▭ | _The Sum of All Fears_ | –Clancy, Tom | 100% |
| ▭ | _Debt of Honor_ | –Clancy, Tom | 100% |

▭ denotes additional information.

SYSTEM AND METHOD FOR PROVIDING RECOMMENDATION OF GOODS OR SERVICES BASED ON RECORDED PURCHASING HISTORY

BACKGROUND OF THE INVENTION

1. Field Of The Invention

The present invention relates to the use of computer systems to facilitate the recommendation of goods or services utilizing a distributed network such as the Internet, specifically to provide recommendations of goods or services that may be of interest to potential customers based on a potential customers' selection of goods or services and a database of previous customer history with respect to the selected goods or services.

2. Description Of The Background Art

Providing recommendations of goods or services of interest to customers in a computer system environment has been based on demographic profiles and usually requires extensive customer participation and divulgence of personal information (for example, the input of: age, profession, hobbies, gender, . . . ) to create a user profile, which is then compared against other user profiles to determine possible items of interest to the user. The need for extensive customer input limits the appeal of these feedback systems because they require the user to expend substantial time and effort in addition to revealing personal details in order to obtain the requested information.

The present invention allows potential customers to utilize a computer system interfaced with a distributed network to obtain recommendations of goods or services that may be of interest to them while substantially reducing the degree of customer input required in comparison to prior art systems. Instead of relying on the personal information provided by each potential customer as a basis for determining recommendations, the subject invention utilizes a customer activity history database to facilitate the determination of recommendations.

SUMMARY OF THE INVENTION

A method for recommending goods or services is provided which allows the user of a computer system connected to a distributed network such as the Internet to receive recommendations of goods or services of potential interest based on a particular good or service selected by the user and previous customer buying history. The previous customer buying history is assembled by passively tracking and retaining or storing all purchasing decisions by previous customers.

The user first selects a particular good or service he may be interested in obtaining. This selection is treated as filter data input to a host computers' data processor. The data processor then compares this input data with a customer activity history database to determine if there are any possible goods or services that can be recommended to the user. If there are possible recommendations the user can choose to have those goods or services recommended to him by the system. The data processor then utilizes the filter data input and the customer history database to determine all of the customers who have purchased the particular good or service selected by the user and all the goods or services those customers-have purchased. The goods or services purchased in common by this group of customers are returned as filtered output data and displayed to the user as recommended goods or services.

According to another aspect of the invention, a confidence factor indicating the level of confidence in the strength of the recommendation may be provided.

DETAILED DESCRIPTION OF THE PREFERRED EMBODIMENT

In the preferred embodiment, books are recommended over the Internet using World Wide Web technology although any communication medium could be used including distributed networks such as Local Area Networks (LANs), Wide Area Networks (WANs), or Electronic Bulletin Board Systems (BBSs). For purposes of illustration, the preferred embodiment will be described in the context where the goods or services are books; however, the invention may be practiced with respect to any good or service.

Figure 1:
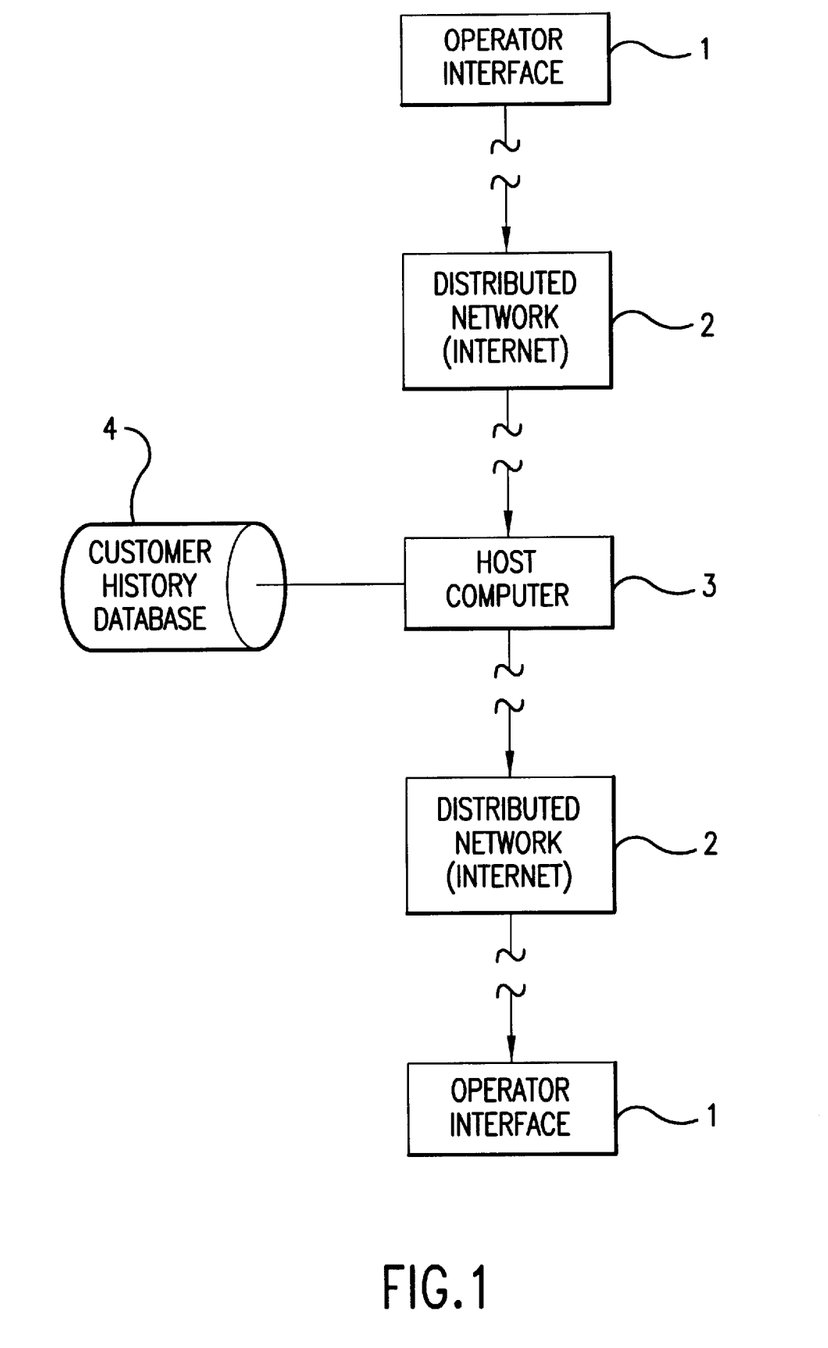
FIG. 1 is a block diagram showing one preferred embodiment of the present invention.

With reference to FIG. 1 a remote user utilizing an operator interface 1 accesses a distributed network communication medium 2, such as, for example, the Internet via the World Wide Web. The operator interface 1 may be any computer with a modem, network card or any other device including wireless devices utilized in computer systems to facilitate the transmission of data and may be found in personal computers used in households, business offices or schools. The computer can be any device capable of processing data such as computers based on technology from Apple Computer (e.g., The Macintosh, The Performa, the PowerMac series, etc.) or technology based on processors by Intel, AMD, Cyrix, etc. and commonly referred to as IBM compatibles. It should be noted however that a user need not have a computer (i.e., a machine with processing power); a so-called "dummy terminal" being sufficient. Once logged onto the Internet, the user accesses a host computer 3 by specifying a website domain address, as is well known. The host computer 3 contains information regarding goods or services (such as books) for sale and also contains a customer purchasing history database 4 which stores data describing all purchases of previous customers.

One preferred method of retrieving recommendation information will be explained with reference to FIGS. 1, 2 and 3A–3E, and will be described with particular reference to retrieving information regarding the purchase and recommendation of books.

Figure 2:
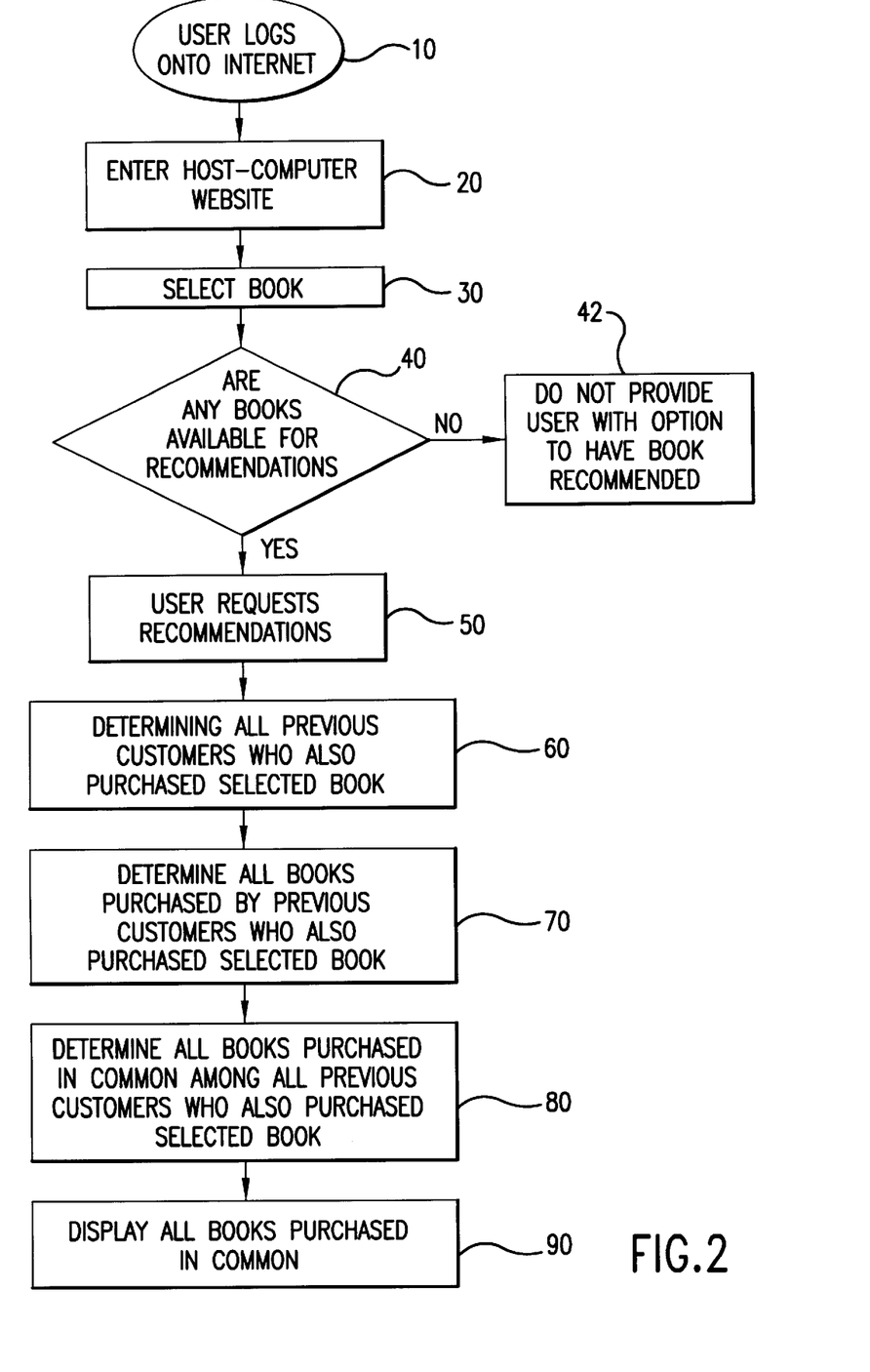
FIG. 2 is a flow diagram showing one preferred embodiment of user interaction with a customer history database.

At step 10, a user logs onto the Internet network, such as by obtaining access through an Internet service provider, and at step 20, the user enters the website by retrieving information from host computer 3.

Figure 3A:
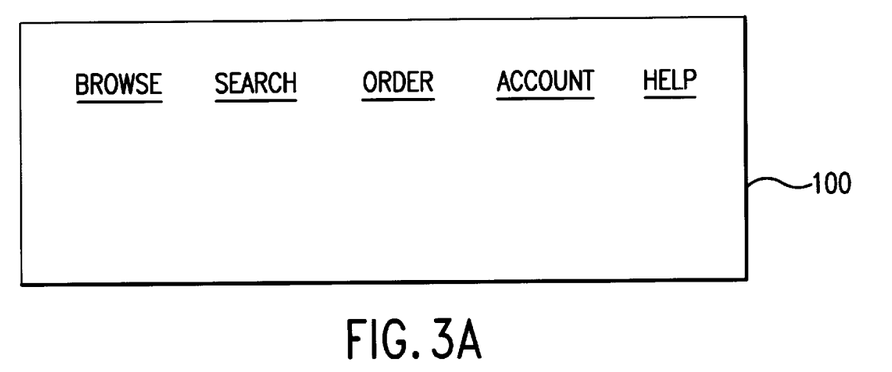
FIG. 3A is a depiction of the home page of the website as displayed to the user which provides the search option to the user.

A screen display 100 as shown in FIG. 3A provides various hypertext selections for various actions to be performed. As indicated, a user may choose to browse, search, order, retrieve account information, or request help.

Figure 3B:
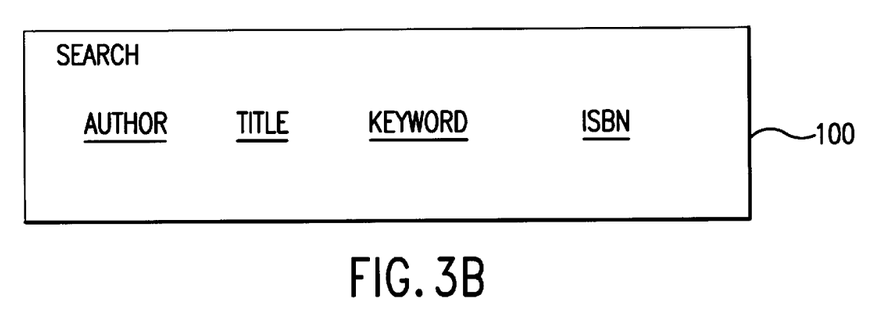
FIG. 3B is a depiction of the search page as displayed to the user where the user can search by author, title, keyword, or ISBN.

The user can select a book by choosing the Search function in FIG. 3A. Once the search function has been selected, the user may search for the book by either author, title, keyword or a International Standard Book Number (ISBN) as shown in FIG. 3B.

Figure 3C:
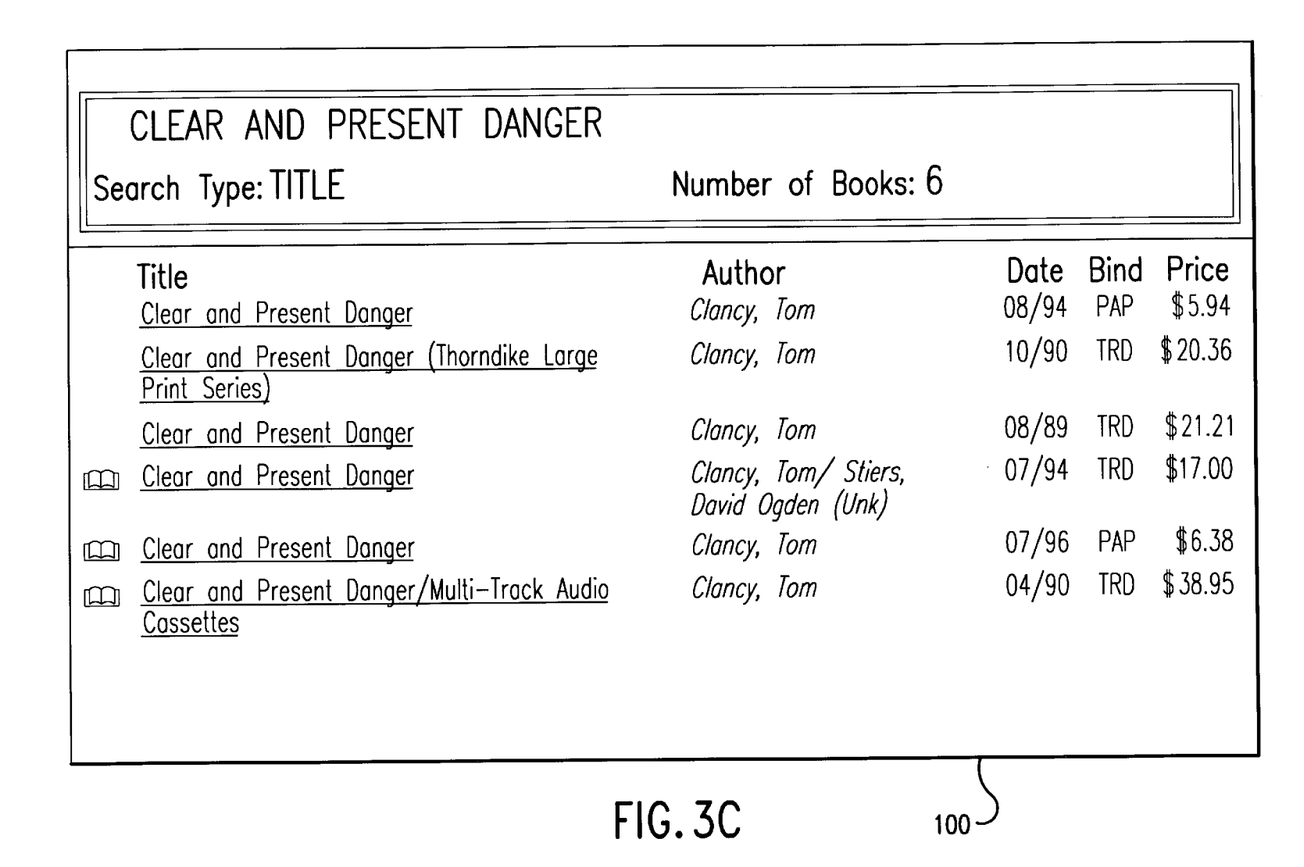
FIG. 3C is a depiction of the search results page as displayed to the user where the user can select a particular book.
Figure 3D:
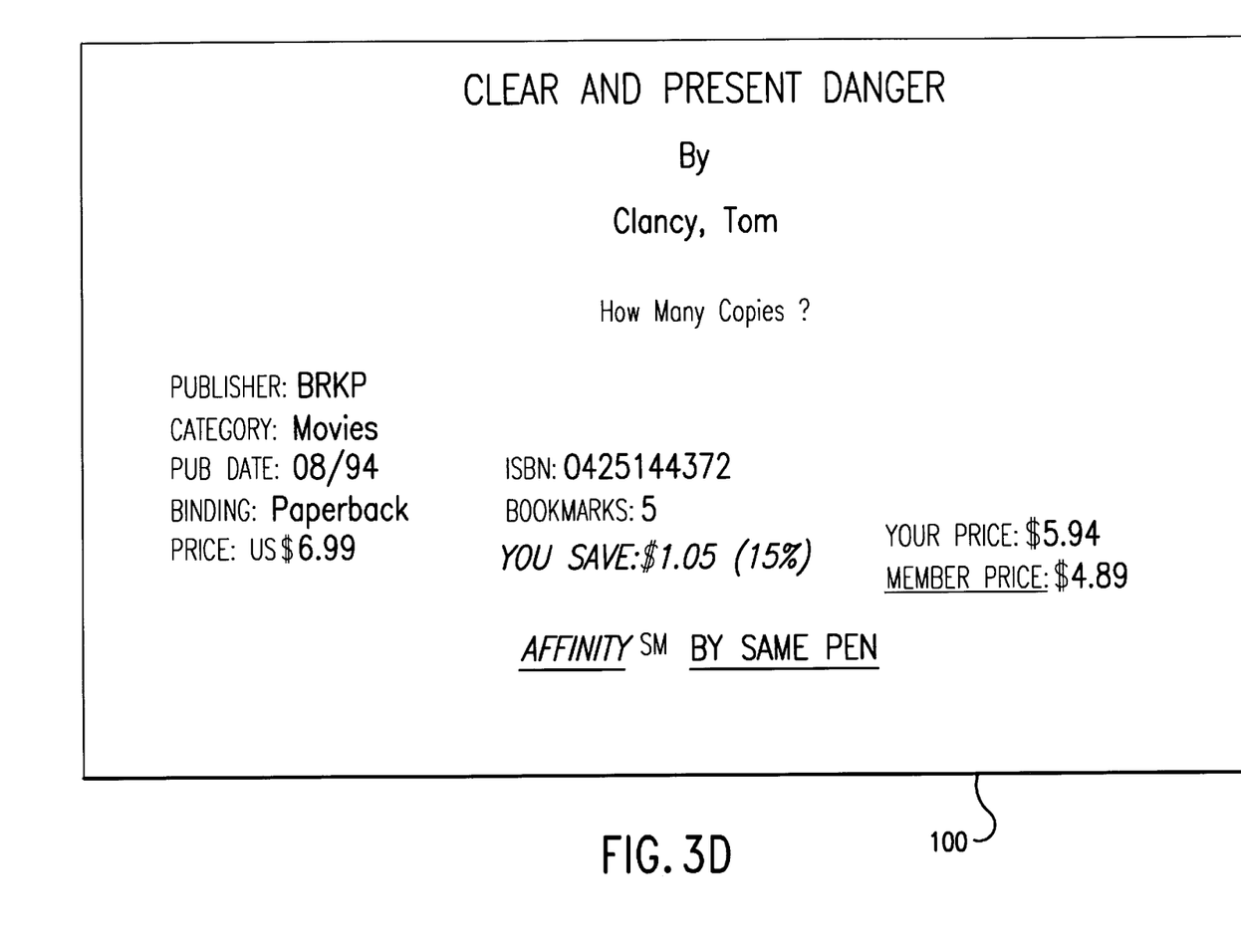
FIG. 3D is a depiction of the book selection page as displayed to the user where the user can select to have recommendations of potential interest returned to him.

The user may utilize any of these methods to select a particular title. In FIG. 3C, a user has selected the title Clear and Present Danger by author Tom Clancy. As shown in FIG. 3C, any particular title may be available in a number of different formats or editions. Once a specific title is selected from among the choices in FIG. 3C, the host computer 3 determines if there are any possible recommendations available for this particular book. If no other books are available as recommendations, the host computer will not give the user the option to request recommendations; the user can still purchase the selected title or request other information concerning this book. If other books are available as recommendations the option to request recommendations is supplied to the user in the form of a hypertext display as shown in FIG. 3D as the Affinity™ service.

The system determines whether other books are available to be recommended by consulting the customer history database 4. The customer history database includes three relational database tables consisting of Customers, Orders and Items. The tables are related to each by keying unique customer IDs in the Customer table to order numbers in the Orders table and product identification numbers in the Items table. For example, books may be identified by their unique ISBN in the Items table. When a user has selected a particular book, the system searches the database 4 to determine all previous customers who have purchased that book. If there exist in the database at least two other customers who have purchased the user-selected book and those at least two customers have also purchased other books (or other products) in common, then the Affinity™ hypertext link will appear in the display page for the selected book. If the search does not find at least two customers who have purchased the selected book and who have also purchased another book in common, the Affinity™ hypertext link will not appear in the display page. Once the user activates the Affinity™ hypertext link, the books purchased in common will be displayed, as shown in FIG. 3E.

Figure 3E:
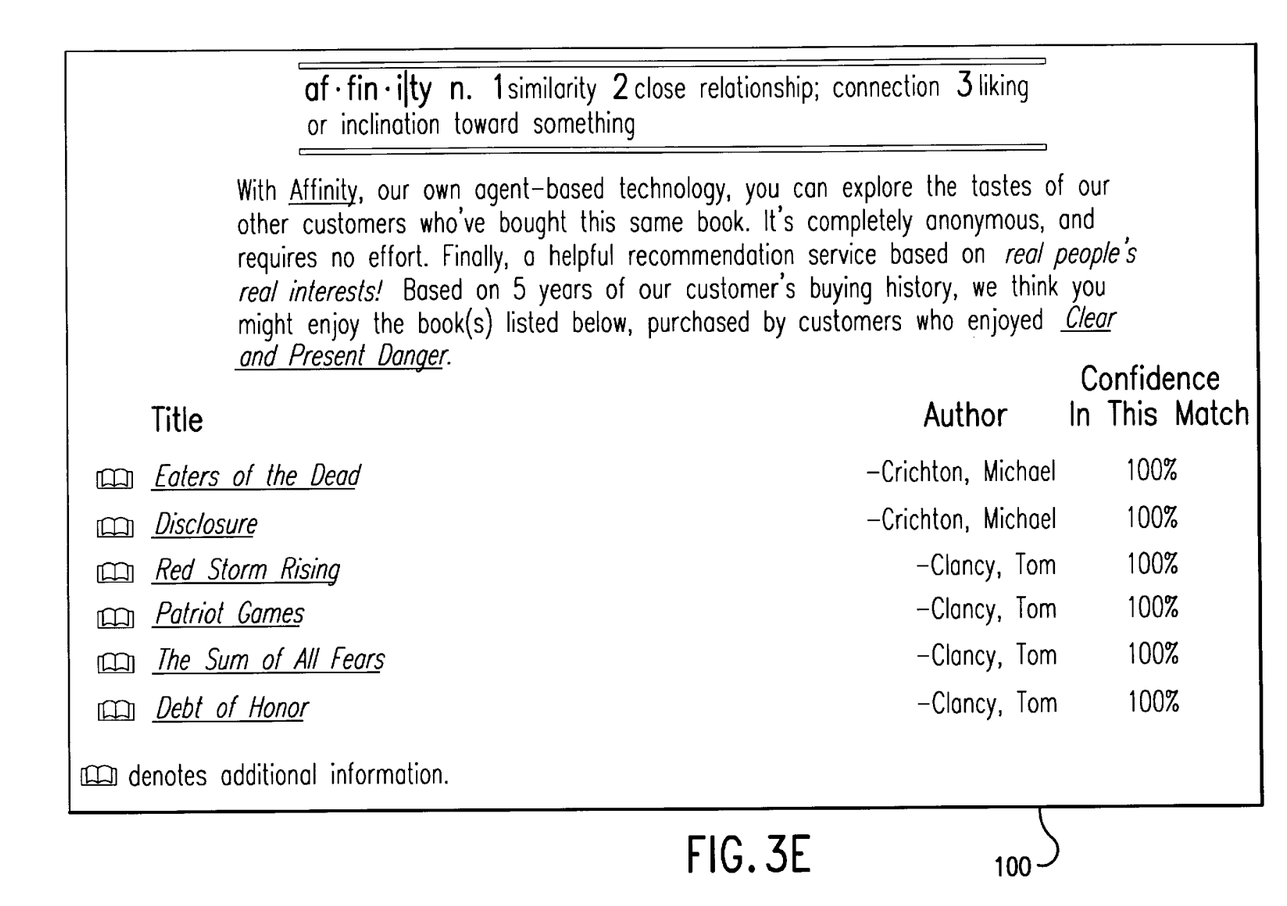
FIG. 3E is a depiction of the recommendations result page as displayed to the user.

Another aspect of the invention is the indication of a "confidence match" factor as shown in FIG. 3E. The confidence factor is calculated based on the frequency of appearance of the recommended books (or other items) in the histories of the customers who have purchased the selected book (or other item). For example, if ten customers who purchased book A also purchased book B, the confidence factor in the recommendation of book B to a user who selected book A would be 100%. If on the other hand only 7 of the ten customers who purchased book A also purchased book B, the confidence factor for book B would be 70%. As previously explained above, if none of the customers who purchased book A also purchased at least one other book in common, the Affinity™ hypertext link would not be displayed.

The user makes a request for recommended books by selecting the Affinity™ hypertext using a tracking device such as a mouse. The request is then transmitted to the host computer 3 via the Internet 2 and is processed at the host computer 3. To facilitate the processing and storage of data each customer is assigned a unique customer ID and each book is identified by its unique ISBN. The host computer utilizes these elements to track and retain the identification of all customers and their purchases. The retained customer purchasing history is stored in the customer history database 4 and is accessed whenever a request for recommendations is submitted to the host computer.

Utilizing the customer history database 4, the host computer 3 searches all the books purchased by all the customers who have purchased the particular book that was selected by the user. Titles which have been purchased in common among the customers are selected as recommendations for the user. This collaborative filter or intelligent agent is superior to other methods because it uses actual customer purchasing history to assemble recommendations. It does not require any customer effort nor impinge on customer privacy. The recommendations are then transmitted to the user via the Internet 2 and displayed on the user interface 1 as shown in FIG. 3E.

Figure 4:
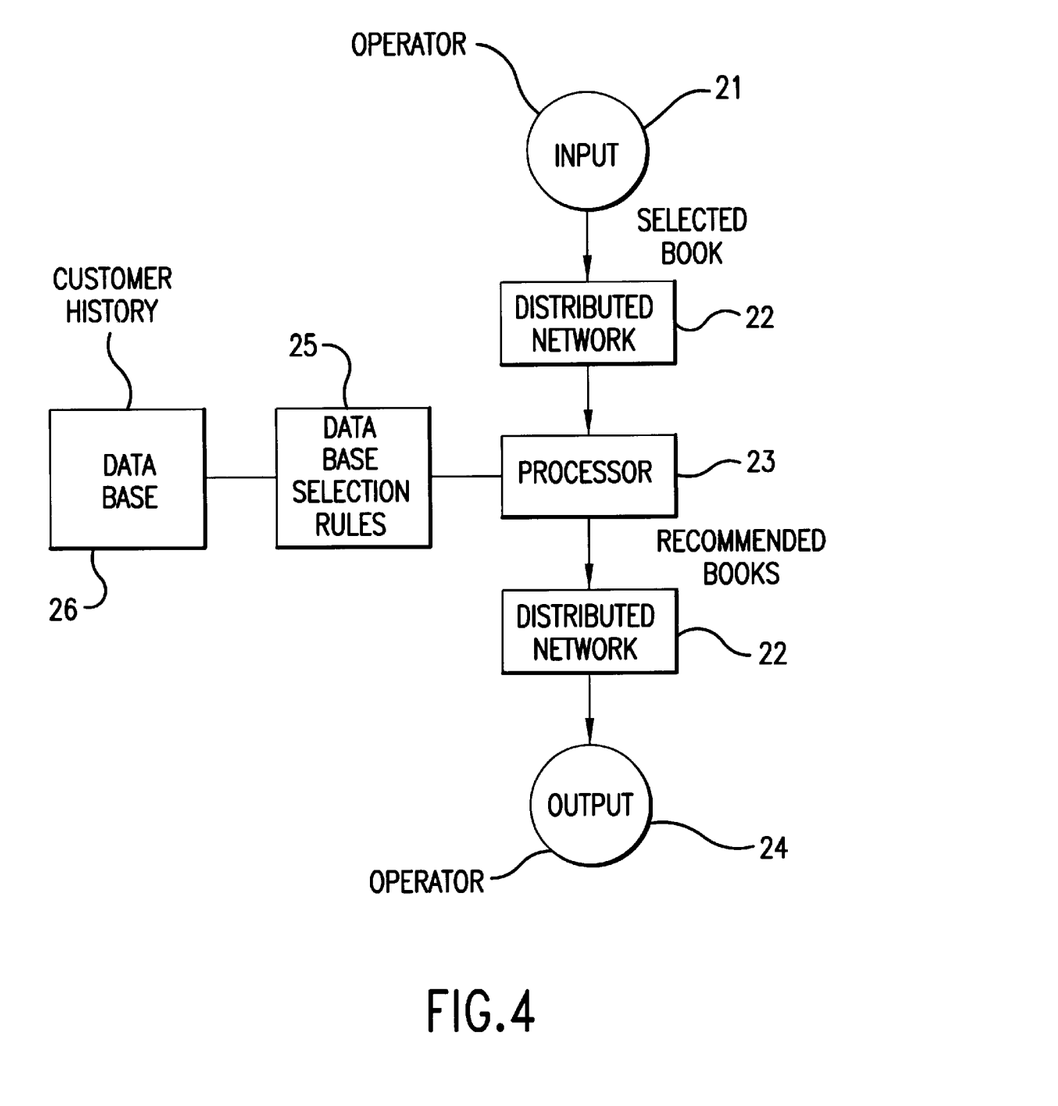
FIG. 4 is a flow diagram showing one preferred embodiment of the computer-implemented systems' structure and data flow.

FIG. 4 illustrates one example of the system structure and data flow. An operator enters input data 21 consisting of a selected book. This input data 21 is transmitted from the operator to the processor 23 via a distributed network 22 similar to the distributed networks described earlier with reference to block 2 in FIG. 1. The processor utilizes database selection rules 25 as explained above in conjunction with the input data 21 to determine the recommendations that will be accessed from the database 26 which contains data on previous customer purchasing history. The recommendations are then transmitted from the processor 23 to the operator as output data 24 via a distributed network as previously described with reference to FIG. 1 block 2.

The invention having been described, it will be apparent to those skilled in the art that the same may be varied in many ways without departing from the spirit and scope of the invention. Any and all such modifications are intended to be included within the scope of the following claims.

I claim:

1. A computer-implemented method for the recommendation of goods and/or services to potential customers over a distributed network based on customer buying history utilizing an information processing system containing processing means having transmission means for receiving and transmitting data, and database storage means for storing information in database files, the method comprising the steps of:

receiving customer commands specifying a particular good or service to be used as filter data;

storing information pertaining to goods and/or services purchasing history of previous customers;

comparing said filter data with said stored information and determining whether, for said filter data, corresponding entries exist within the stored information; and     if corresponding entries exist, displaying the identity of other goods and/or services purchased by said previous customers who have purchased the good and/or service used as said filter data.

2. The method of claim 1 wherein said distributed network is the Internet.

3. The method of claim 1 wherein said distributed network is-a Local Area Network.

4. The method of claim 1 wherein said distributed network is a Wide Area Network.

5. The method of claim 1 wherein said distributed network is a Bulletin Board System.

6. The method of claim 1 wherein said goods are books.

7. A computer-implemented interactive system for assisting a potential customer in purchasing decisions from among a plurality of goods or services, the system comprising:

an operator interface for enabling potential customers to input requests to said computer, including requests for:
the purchase of goods or services,
information concerning goods or services,
recommendations of goods or services based on operator input;

a database maintained in said computer, containing information pertaining to goods and/or services purchasing history of previous customers;

means for processing inputted requests and for filtering relevant history information regarding said inputted requests from said database;

a distributed network for transmitting requests from said operator interface to said computer and for transmitting responsive information from said computer to said operator interface;

interface whereby goods and/or services identification information corresponding to goods and/or services purchased by previous customers who have purchased the goods and/or services requested by said potential customers are transmitted to said operator interface for use by said potential customers.

8. The system of claim 7 wherein said distributed network is the Internet.

9. The system of claim 7 wherein said distributed network is a Local Area Network.

10. The system of claim 7 wherein said distributed network is a Wide Area Network.

11. The system of claim 7 wherein said distributed network is a Bulletin Board System.

12. The system of claim 7 wherein said goods are books.

13. The system of claim 7 wherein said operator interface is a personal computer.

14. The system of claim 7 wherein said operator interface is a workstation.

15. The system of claim 7 wherein said operator interface is a dummy terminal.

16. A computer program product having a computer readable medium having computer readable code recorded thereon for the recommendation of goods or services in response to user input, comprising:

input means for receiving user commands specifying a particular good or service to be used as filter data;

database storage means for the retention of data concerning goods or services purchase decisions of prior users; and means for filtering said database storage means using said specified particular rood or service to obtain recommendations of other goods or services to a user based on said inputted user commands.

* * * * *

UNITED STATES PATENT AND TRADEMARK OFFICE
CERTIFICATE OF CORRECTION

PATENT NO. : 6,782,370 B1
DATED : August 24, 2004
INVENTOR(S) : Charles Stack

It is certified that error appears in the above-identified patent and that said Letters Patent is hereby corrected as shown below:

<u>Column 6,</u>
Line 26, "rood" should be -- good --.

Signed and Sealed this

Sixteenth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,782,370 B1
DATED : August 24, 2004
INVENTOR(S) : Charles Stack

Page 1 of 1

It is certified that error appears in the above-identified patent and that said Letters Patent is hereby corrected as shown below:

Column 5,
Line 25, delete "interface".

Signed and Sealed this

First Day of November, 2005

JON W. DUDAS
*Director of the United States Patent and Trademark Office*